(12) United States Patent
Kropaczek et al.

(10) Patent No.: US 7,266,481 B2
(45) Date of Patent: Sep. 4, 2007

(54) METHOD, ARRANGEMENT AND COMPUTER PROGRAM FOR DETERMINING STANDARDIZED ROD TYPES FOR NUCLEAR REACTORS

(75) Inventors: David Joseph Kropaczek, Wilmington, NC (US); Mehdi Asgari, Wilmington, NC (US); Christian Carlos Oyarzun, Wilmington, NC (US); Steven Barry Sutton, Wilmington, NC (US); William Earl Russell, II, Wilmington, NC (US); William Charles Cline, Wilmington, NC (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 390 days.

(21) Appl. No.: 10/879,358

(22) Filed: Jun. 30, 2004

(65) Prior Publication Data

US 2004/0243370 A1    Dec. 2, 2004

Related U.S. Application Data

(63) Continuation-in-part of application No. 10/325,831, filed on Dec. 23, 2002.

(51) Int. Cl.
*G06G 7/48* (2006.01)
*G06F 17/10* (2006.01)

(52) U.S. Cl. .............................................. 703/6; 703/2
(58) Field of Classification Search ..................... 703/2, 703/6, 13; 706/11; 376/247, 254, 267, 411, 376/172
See application file for complete search history.

(56) References Cited

U.S. PATENT DOCUMENTS

| | | | | |
|---|---|---|---|---|
| 4,393,025 A | * | 7/1983 | Leyse | 376/247 |
| 4,495,136 A | * | 1/1985 | Camden et al. | 376/172 |
| 4,844,858 A | * | 7/1989 | Fero et al. | 376/254 |
| 6,208,982 B1 | * | 3/2001 | Allen et al. | 706/11 |
| 6,748,348 B1 | * | 6/2004 | Russell, II | 703/6 |
| 6,862,329 B1 | * | 3/2005 | Kropaczek et al. | 376/267 |
| 2004/0052326 A1 | * | 3/2004 | Blanpain et al. | 376/411 |
| 2004/0122629 A1 | * | 6/2004 | Russell et al. | 703/2 |

OTHER PUBLICATIONS

Dettmer, R. Safe Integral Reactor-Pacifying the PWR, IEE Review, vol. 35, No. 10, Nov. 1989, pp. 387-390.*

(Continued)

*Primary Examiner*—Russell Frejd
(74) *Attorney, Agent, or Firm*—Harness, Dickey & Pierce, P.L.C.

(57) ABSTRACT

A method, arrangement and computer program is described for determining a set of standardized rod types for use in a nuclear reactor core. The method may include defining a set of rod type-related limits, and determining, based on the limits, an initial population of rod types to be evaluated for use in cores of a selected number of nuclear reactor plants. Based on the initial population of rod types a database of selectable fresh fuel bundle designs applicable to the one or more cores may be generated. Bundle data related to at least a subset of the selectable fresh fuel bundle designs may be retrieved from the database, and a target number of rod types may be selected from the initial population based on the retrieved bundle data as the set of standardized rod types.

18 Claims, 9 Drawing Sheets

OTHER PUBLICATIONS

Kim et al., K.K. Considerations in the Control of PWR-Type Multimodular Reactor Plants, IEEE Transactions on Nuclear Science, vol. 41, No. 6, Dec. 1994, pp. 2686-2697.*

Francois et al., J.L. Development of an Automated System for Fuel Reload Patterns Design, Nuclear Engineering and Design, vol. 193, No. 1-2, Sep. 1999, pp. 13-21.*

* cited by examiner

US 7,266,481 B2

METHOD, ARRANGEMENT AND COMPUTER PROGRAM FOR DETERMINING STANDARDIZED ROD TYPES FOR NUCLEAR REACTORS

CROSS-REFERENCE TO RELATED CASES

This application is a continuation-in-part of, and claims domestic priority benefits under 35 U.S.C. §120 to, co-pending U.S. patent application Ser. No. 10/325,831 to David J. Kropaczek et al., filed Dec. 23, 2002 and entitled "Method and Arrangement for Determining Nuclear Reactor Core Designs". This application is related to co-pending U.S. patent application Ser. No. 10/879,122 to David J. Kropaczek et al., filed Jun. 30, 2004 and entitled "Method, Arrangement and Computer Program for Generating Database of Fuel Bundle Designs for Nuclear Reactors". The entire contents of both applications are incorporated by reference herein.

BACKGROUND OF THE INVENTION

1. Field of the Invention

This invention relates generally to nuclear reactors, and more particularly to determining standardized rod types applicable to a plurality of different fuel bundles in cores of different nuclear reactors.

2. Description of the Related Art

A core of a nuclear reactor such as boiling water reactor (BWR) or pressurized water reactor (PWR) has several hundred individual fuel bundles of fuel rods (BWR) or groups of fuel rods (PWR) that have different characteristics. These bundles (or fuel rod groups) are preferably arranged so that interaction between rods within a fuel bundle, and between fuel bundles satisfies all regulatory and reactor design constraints, including governmental and customer-specified constraints. Additionally for a BWR, the control mechanisms, e.g. rod pattern design and core flow, must be determined so as to optimize core cycle energy. Core cycle energy is the amount of energy that a reactor core generates before the core needs to be refreshed with new fuel elements, such as is done at an outage.

In the case of a BWR, for example, the number of potential fuel bundle arrangements within the core and individual fuel rod types within a bundle may be in excess of several hundred factorial. From these many different possible configurations, only a small percentage of fuel rod types may satisfy all applicable design constraints for a particular core of a nuclear reactor. Further, only a small percentage of these fuel rod types, which do satisfy all applicable design constraints, are economical. Conventionally, a typical fuel bundle useable in a BWR core may include between about 10-30+ different rod types therein. This is undesirable, in that the greater the number of different rods types, the greater the manufacturing complexities and cost, which may result in higher bundle costs to the consumer.

Traditionally, rod pattern, fuel bundle and/or core design determinations have been made on a trial and error basis. Specifically, and based on only the past experience of the engineer or designer, in designing a particular design an initial design was identified. The initially identified design, such as a particular fuel bundle design for a core, was then simulated in a virtual core by computer. If a particular design constraint was not satisfied, then the arrangement was modified and another computer simulation was run. Many weeks of resources typically were required before an appropriate design was identified using the above-described procedure.

For example, one conventional process being used is a stand-alone manual process that requires a designer to repeatedly enter reactor plant specific operational parameters into an ASCII text file, which may serve as an input file. Data entered into the input file may include the configuration of fresh and exposed fuel bundle placements, blade notch positions of control blades (if the evaluated reactor is a boiling water reactor (BWR)), soluble boric acid concentration (if a PWR, for example), core flow, core exposure (e.g., the amount of burn in a core energy cycle, measured in mega-watt days per short ton(MWD/st), etc.

A Nuclear Regulatory Commission (NRC) licensed core simulation program, which may be embodied as a software program running on a suitable computer, for example, reads the resulting input file and outputs the results of the simulation to a text or binary file. A designer then evaluates the simulation output to determine if the design criteria have been met, and also to verify that no violations of margins to thermal limits have occurred. Failure to meet design criteria (i.e., violations of one or more limits) requires a manual designer modification to the input file. Specifically, the designer would manually change one or more operational parameter(s) and rerun the core simulation program. This process may be repeated until a satisfactory design was achieved.

This process is extremely time consuming. The required ASCII text files are laborious to construct, and often are error prone. The files are fixed-format and extremely long, sometimes exceeding five thousand or more lines of code. A single error in the file results in a crash of the simulator, or worse, results in a mildly errant result that may be hard to initially detect, but will profligate with time and iterations to perhaps reduce core cycle energy when placed in an actual operating nuclear reactor core. Additionally, no assistance is provided via the manual iterative process in order to guide a designer toward a more favorable solution. In the current process, the responsible designer or engineer's experience and intuition are the sole means of determining a design solution.

There is believed to be no process developed which can effectively design fuel bundles that are useful over a wide range of nuclear reactors (or different reactor designs at different plant sites), and which satisfies multiple core constraints or design parameters for each of the different reactors. Further, there is believed to be no known automated process to determine a given, standardized set of rod types for building fuel bundles that may be applicable to many different nuclear reactors.

SUMMARY OF THE INVENTION

Exemplary embodiments of the present invention are directed to a method, arrangement and computer program for determining a set of standardized rod types for use in one or more cores of one or more nuclear reactor plants. In an example, the method may include defining a set of rod type-related limits, and determining, based on the limits, an initial population of rod types to be evaluated for use in cores of a selected number of nuclear reactor plants. Based on the initial population of rod types a database of selectable fresh fuel bundle designs applicable to the one or more cores may be generated. Bundle data related to at least a subset of the selectable fresh fuel bundle designs may be retrieved from the database, and a target number of rod types may be selected from the initial population based on the retrieved bundle data as the set of standardized rod types.

BRIEF DESCRIPTION OF THE DRAWINGS

The present invention will become more apparent by describing, in detail, exemplary embodiments thereof with reference to the attached drawing, wherein like elements are represented by like reference numerals, which are given by way of illustration only and thus do not limit the exemplary embodiments of the present invention.

DETAILED DESCRIPTION OF THE EXEMPLARY EMBODIMENTS

A method, arrangement and computer program for determining standardized rod types for fuel bundles usable in different nuclear reactor cores is described. The arrangement may include a graphical user interface (GUI) for communicating with a user and interacting with a computer-based system and/or processing medium (e.g., software-driven computer program, processor, applications driven by application servers, etc.). This may enable the user to virtually create and evaluate core designs loaded with selected fresh fuel bundles, in order to determine a given, standardized set of rod types for a desired fuel bundle that may be implemented in various reactor cores of different nuclear reactor plants, for installation at a next scheduled outage for a reactor plant, and/or as part of a new core for a reactor plant, for example.

Figure 1:
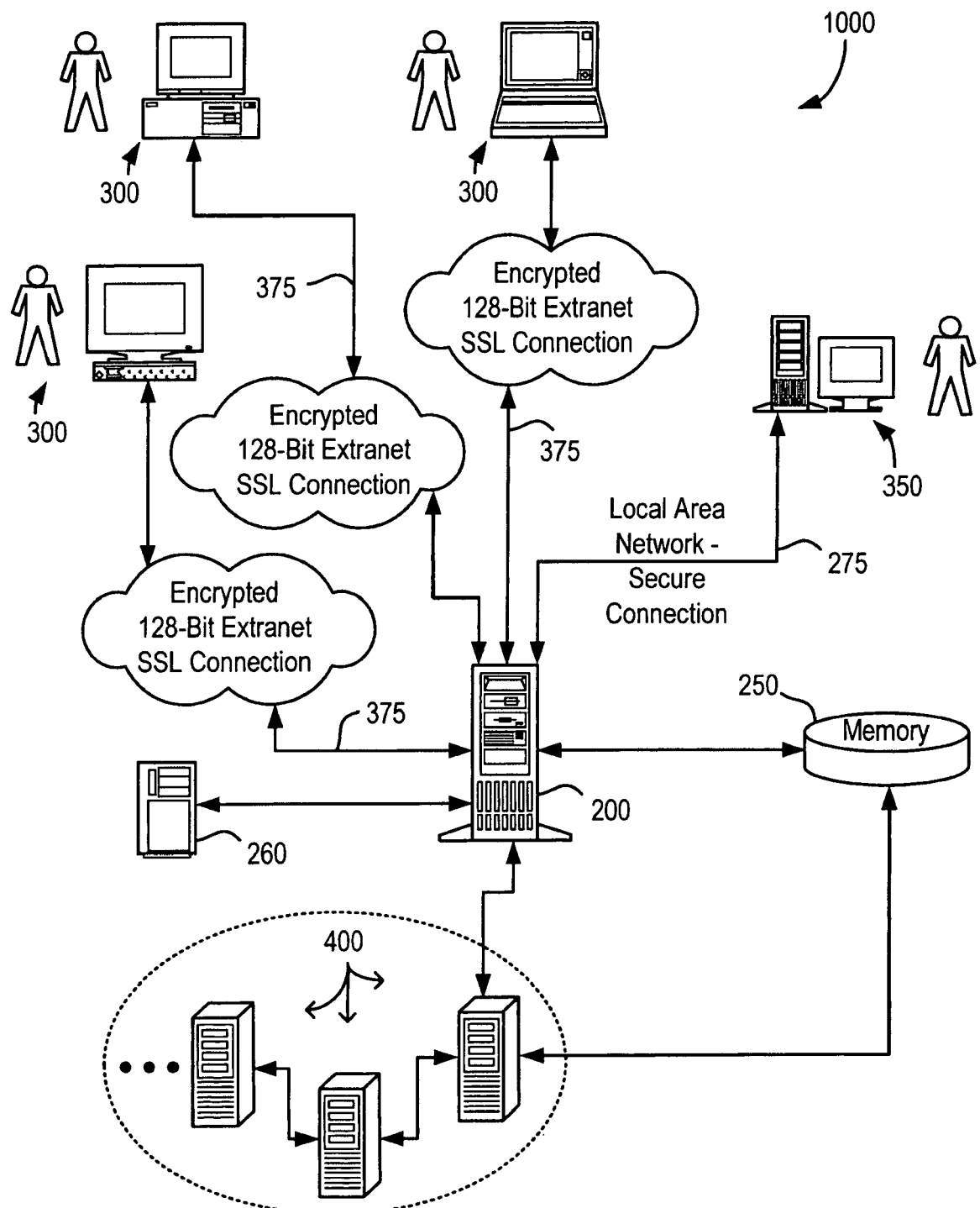
FIG. 1 illustrates an arrangement for implementing the method in accordance with an exemplary embodiment of the invention.

FIG. 1 illustrates an arrangement for implementing the method in accordance with and exemplary embodiment of the invention. Referring to FIG. 1, arrangement 1000 may include an application server 200, which may serve as a central nexus of an accessible website, for example. The application server 200 may be embodied as any known application server software, such as Citrix MetaFrame Presentation server, for example. Application server 200 may be operatively connected to a plurality of calculation servers 400, a cryptographic server 260 and to a memory 250. Memory 250 may be embodied as a relational database server, for example.

A plurality of external users 300 may communicate with application server 200 over a suitable encrypted medium such as an encrypted 128-bit secure socket layer (SSL) connection 375, although the present invention is not limited to this encrypted communication medium. An external user 300 may connect to the application server 200 over the Internet or from any one of a personal computer, laptop, personal digital assistant (PDA), etc., using a suitable interface such as a web-based Internet browser. Further, application server 200 is accessible to internal users 350 via a suitable local area network connection (LAN 275), so that internal users 350 have access over an intranet for example. Hereafter for reasons of brevity, 'user' is employed generically to denote any of an external user 300, internal user 350 or other designer accessing arrangement 1000. For example, the user may be any of a representative of a nuclear reactor plant accessing the website to determine a desired core design for his or her nuclear reactor, and/or a vendor hired by a reactor plant site to develop core designs or particular fuel bundle designs for a core by using the methodology and arrangement of the present invention.

The application server 200 provides a centralized location for users to access an application. Essentially, each user application session may be running on the server but displayed locally to the user access device (e.g., PC) allowing the user to interact with the application. However, this means of deployment is provided as an exemplary embodiment, and does not limit a given user from running the application locally on their access device. The application is responsible for directing all calculations and accessing of data in order to calculate objective function values, and for the creation of suitable graphical representations of various features of a core design that a user may desire to review. The graphical information is communicated over the 128-bit SSL connection 375 or LAN 275, to be displayed on a suitable display device of the user.

Figure 2:
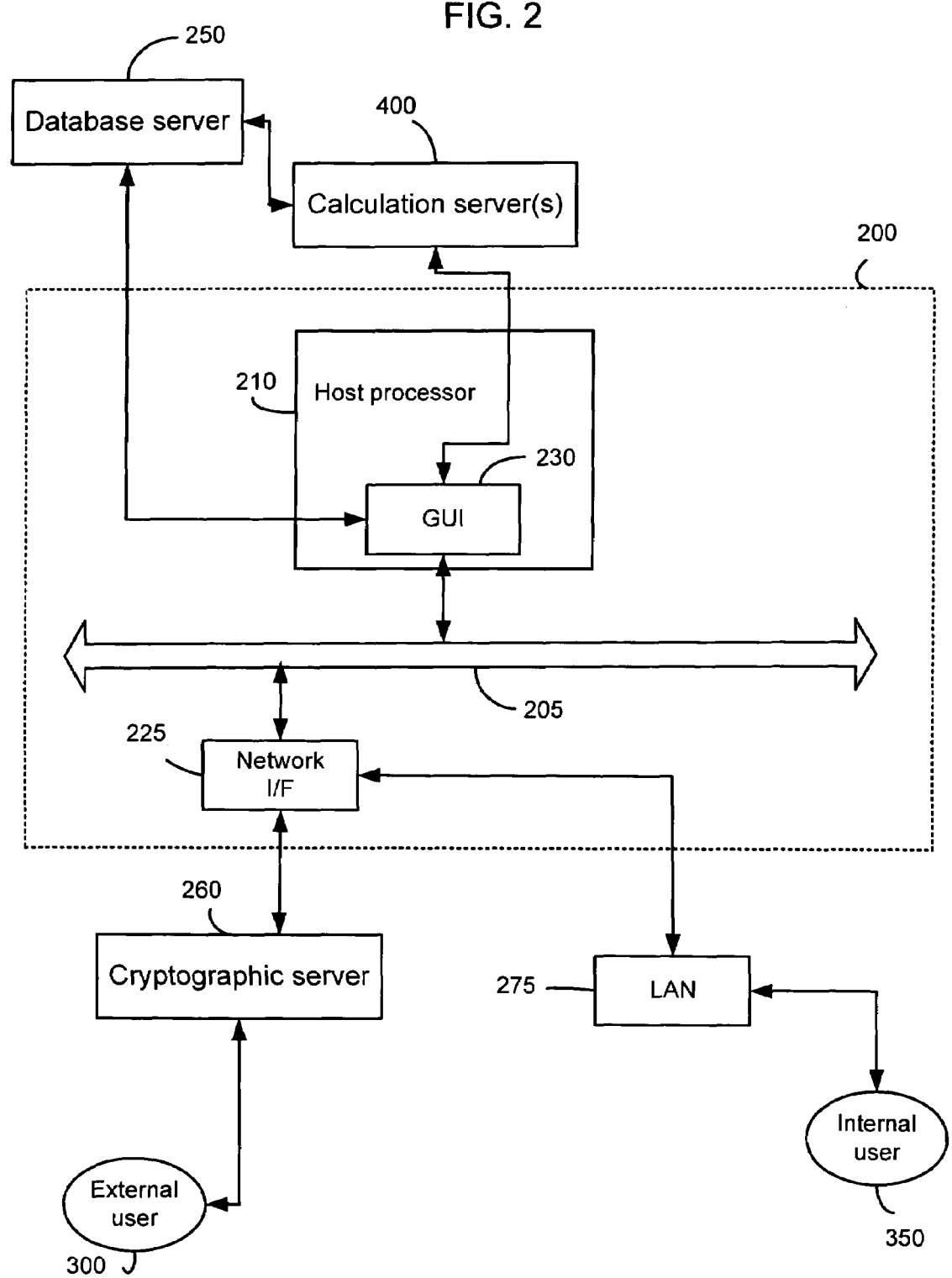
FIG. 2 illustrates an application server of the arrangement for implementing the method in accordance in an exemplary embodiment of the invention.

FIG. 2 illustrates an application server 200 associated with the arrangement of FIG. 1. Referring to FIG. 2, application server 200 utilizes a bus 205 to connect various components and to provide a pathway for data received from the users. Bus 205 may be implemented with conventional bus architectures such as peripheral components interconnect (PCI) bus that is standard in many computer architectures. Alternative bus architectures such as VMEBUS, NUBUS, address data bus, RDRAM, DDR (double data rate) bus, etc. could of course be utilized to implement bus 205. Users communicate information to application server 200 over a suitable connection (LAN 275 and/or network interface 225) to communicate with application server 200.

Application server 200 may also include a host processor 210, which may be constructed with conventional microprocessors such as currently available PENTIUM processors. Host processor 210 represents a central nexus from which all real time and non-real functions in application server 200 are performed, such as graphical-user interface (GUI) and browser functions, directing security functions, directing calculations such as calculation of the objective functions for various limits, etc., for display and review by the user. Accordingly, host processor 210 may include a GUI 230 which may be accessed through the use of a browser. Browsers are software devices which present an interface to, and interact with, users of the arrangement 1000. In the examplary embodiment, a browser in conjunction with a Citrix ICA client (part the commercially available Citrix MetaFrame Access Suite software) may be responsible for formatting and displaying the GUI 230.

Browsers are typically controlled and commanded by the standard hypertext mark-up language (HTML). However, the application being presented or "served" to the user which allows the user to control decisions about calculations, displayed data, etc. may be implemented using C#, Java or Visual Fortran or any combination thereof. In addition, other well-known high-level languages may be incorporated in the applications implementation (e.g., C, C++, etc.). All of these languages may be customized or adapted for the specific details of a given application implementation, and images may be displayed in the browser using well known JPG, GIF, TIFF and other standardized compression schemes, other non-standardized languages and compression schemes may be used for the GUI 230, such as XML, ASP.NET, "home-brew" languages or other known non-standardized languages and schemes. Application server 200 through Network I/F 225 may be operatively connected to a cryptographic server 260. Accordingly, application server 200 implements all security functions by using the cryptographic server 260, so as to establish a firewall to protect the arrangement 1000 from outside security breaches. Further, cryptographic server 260 secures external access to all personal information of registered users.

Application server 200 may be also operatively connected to a plurality of calculation servers 400. The calculation servers 400 may perform some or all the calculations required to process user entered data, direct simulation of a core design, calculate values for comparison as to be described in further detail below, and to provide results which may be displayed via, the GUI 230, and presented by the application server 200.

The calculation servers 400 may be embodied as WINDOWS 2000 servers, for example, although other hardware (e.g., Alpha, IA-64) and platforms (e.g., Linux, Unix) are possible. More particularly, the calculation servers 400 may be configured to perform a multitude of complex computations which may include, but are not limited to, configuring the objective function and computing objective function values, executing a 3D simulator program to simulate reactor core operation on a particular core design which may be loaded with fresh fuel bundles to be evaluated, and to generate outputs from the simulation, providing results data for access and display by a user via GUI 230, and iterating an optimization routine as to be described in further detail below.

Figure 3:
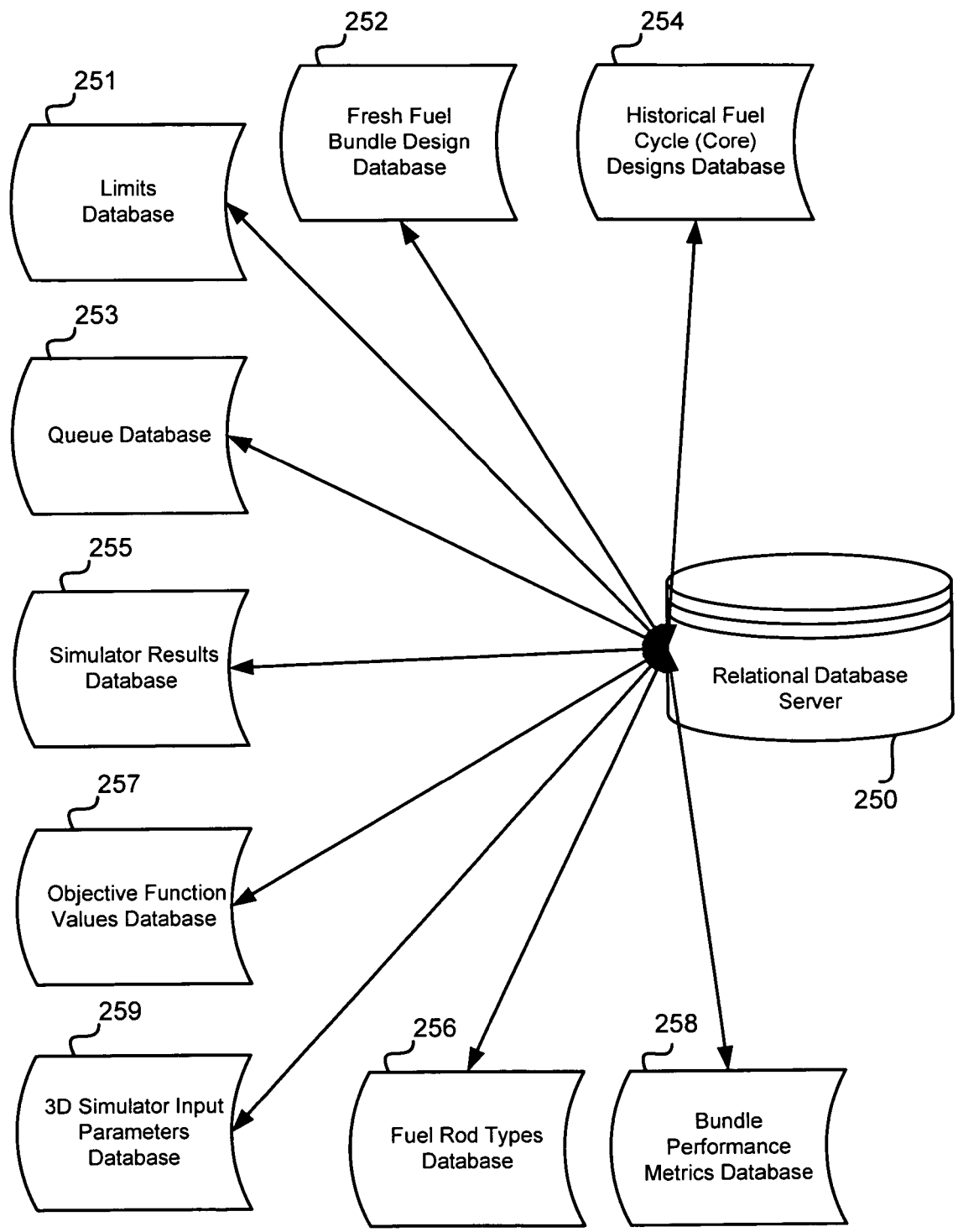
FIG. 3 illustrates a relational database having subordinate databases in accordance with an exemplary embodiment of the invention.

FIG. 3 illustrates an exemplary database server 250 in accordance with an exemplary embodiment of the invention. Memory or database server 250 may be a relational database such as an Oracle relational database. Relational database server 250 may contain a number of subordinate databases that handle all the necessary data and results in order to implement the method of the present invention. For example, relational database server 250 may include storage areas which contain subordinate databases such as limits database 251, which is a database that stores all the user input limits and/or design constraints for all core designs that are evaluated for a particular nuclear reactor. There may also be a fresh fuel bundle design database 252 which may include a palette or plurality of different fresh fuel bundle designs that have been previously created, modeled and stored therein.

Additionally, relational database server 250 may include a queue database 253, which stores parameters for a core design that are to be simulated in the 3D simulator, and a historical core design database 254, which includes historical reactor core loading pattern designs that may be selected in generating a reference core design that is most consistent with defined user-input limits. Further, relational database 250 may include a fuel rod types database 256, which may store a plurality of different fuel rod types and associated rod characteristics, and a bundle performance metrics database 258 which may store a plurality of different bundle metrics for each of a plurality of fuel bundles to be evaluated, for example.

Simulator results may be stored in simulator results database 255. The simulator results database 255 (and limits database 251) may be accessed by the calculation servers 400 in order to calculate a number of objective function values that are applicable to a particular core design. The objective function values may be ranked for a particular fresh fuel bundle design that has been inserted into a virtual core to be modeled, so as to determine whether or not the fresh fuel design meets certain user-input limits or constraints, for example. These objective function values may be stored in an objective function values database 257 within relational database server 250. A 3D simulator input parameters database 259 may also be included within relational database server 250. Database 259 may include the positions of control blades and reactor operating parameters for all exposure steps. As the calculation servers 400 is operatively connected to, and may communicate with, relational database server 250, each of the subordinate databases described in FIG. 3 may be accessible to one or more calculation servers 400.

Figure 4:
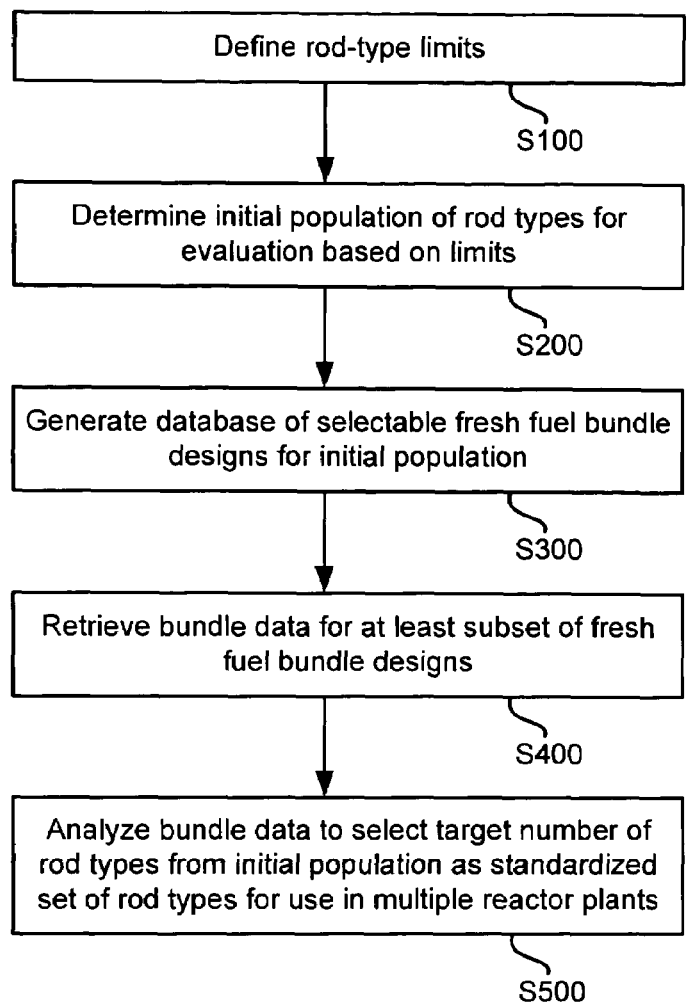
FIG. 4 is a flow chart describing a method of determining a standardized set of rods in accordance with an exemplary embodiment of the invention.

FIG. 4 is a flow chart describing a method of determining a standardized set of rods in accordance with an exemplary embodiment of the invention. Although the following methodology is described in terms of determining a standardized set of fuel rods for a BWR, and will be described in this context, the methodology may be applicable to determining a standardized set of rods for any of a pressurized water reactor, a gas-cooled reactor, a liquid-metal reactor or a heavy water reactor, for example. The following discussion describes the methodology in terms of actions by Referring to FIG. 4, and for a given reactor plant or a given plurality of a reactor plants selected by a user, the user may define the plurality of rod-type limits (S100) by accessing the database server 250 via GUI 230 and host processor 210, and more particularly, by accessing limits database 251, which may contain a plurality of pre-stored rod type limits or constraint parameters for each of the reactor plants being evaluated. Alternatively, rod-type related limits may be input into the limits database 251 by the user. The rod-type limits may be related to the rod type manufacturing conditions. For example, the manufacturing conditions may include an allowable enrichment blend limit or value for a given fuel rod type, an allowable burnable absorber blend limit for a given fuel rod type, an allowable axial zone within a given fuel rod-type limit and allowable rod types for a given fuel bundle constraint or parameter, for example. These are only exemplary rod-type related limits, other limits or constraints may be evident to those having ordinary skill in the art.

Based on the defined rod-type limits, an initial population of rod types to be evaluated in a fuel bundle design may be determined (S200). As will be described further below, the initial population may be determined from a much larger population of rod types as a function of fuel rod mechanical performance and fuel rod cost, for example. These conditions may represent filters to develop the initial population.

Once the initial population of rod types is determined, the user may generate a database of selectable of fresh fuel bundle designs (S300) in order to evaluate the initial population of rod types. As to be described in further detail below, and in general, generation of the database of fresh fuel bundle designs may involve a number of sub-processes. For example, the user may generate an initial population of candidate fresh fuel bundle designs to be evaluated in a virtual core to be simulated. This initial population may be generated from stored historical fresh fuel bundle designs, which may be stored in historical fuel cycle designs database 254, for example.

The user may establish a set of rod type changes to make to a given candidate fresh fuel bundle in the initial population so as to create a modified candidate fresh fuel bundle design. This set of fuel rod type changes may be created by accessing a fuel rod type database 256 so as to determine how a given rod type affects certain bundle performance metrics within a candidate fresh fuel bundle to be evaluated, for example.

A candidate fresh fuel bundle design to be evaluated may be modified by making one (or more rod type changes therein) and a virtual core loaded in accordance with the modified fresh fuel bundle design may be simulated so as to generate a plurality of simulation outputs, or "bundle performance outputs". The bundle performance outputs may be ranked based on a comparison to certain user-input limits related to bundle and/or core performance, for example. Modified candidate fresh fuel bundle designs which satisfy the user-input bundle and/or core-related limits may be stored in fresh fuel bundle design database 252, thereby generating the database to be used for determining a standardized set of rod types.

Once the database is generated, the user may retrieve bundle data for at least a subset of the fresh fuel bundle designs (S400), which satisfy bundle performance metrics for further analysis (S400). This data may be retrieved from fresh fuel bundle design database 252.

The retrieved bundle data may be analyzed in order to select a target number of rod types from the initial population (S500) as the standardized set of rod types for use in multiple reactor plants. In an example, this may be performed by creating, from the retrieved bundle data, a frequency histogram for fuel type occurrences in the subset of fresh fuel bundle designs that were evaluated in generating the database. Based on the frequency histogram, a given number of rod types of the initial population may be eliminated. For example, those rod types which have a frequency of occurrence below a given frequency threshold may be eliminated from the initial population to provide a modified or revised population of rod types. The frequency of occurrence threshold may be set by the user, and a suitable graphical display may be accessed by the user via GUI 230, host processor 210 and relational database 250, which illustrates rod types which may satisfy the frequency threshold criteria.

The revised rod type population may then be further ranked (or filtered) based on the manufacturing or fabrication cost to make each of the rod types of the revised population. The user, via GUI 230, may also obtain a suitable graphical display which shows the ranking in terms of both fabrication costs and frequency of occurrence, if desired. The user may then further analyze the remaining population by iterating a higher cost, lower frequency of occurrence filter so as to achieve a target number of rod types. This target number of rod types, which may represent the standardized set of rod types may then be stored in a relational database 250, particularly in the fuel rod types database 256, for example.

Accordingly, arrangement 1000 may be configured to determine a set of standardized rod types adapted for use in one or more cores of one or more nuclear reactor plants. GUI 230, via network I/F 225, may receive given constraint parameters from a user. The given constraint parameters may be the set of rod-type related (which may be stored in limits database 251), and/or may also include other user-input limits which may be stored in database 251, such as plant specific design constraints, core performance criteria, operational parameter limits used for reactor operation, core safety limits, and margins to those operational and safety limits.

Host processor 210, in conjunction with and/or in operative communication with database server 250 and calculation servers 400, may thus be configured to carry out the functions described in FIG. 4. This may be done based on user-directed input commands via GUI 230, and/or or by selecting desired optimization criteria for iterating an objective function of optimization routine, for example.

The arrangement 1000 may determine, based at least on the rod-type related limits, the initial population of rod types to be evaluated, and may generate selectable fresh fuel bundle designs including one or more of the initial population of rod types which are applicable to the one or more cores. As previously discussed, these generated designs may include populating fresh fuel bundle design database 252 of database server 250. Calculation servers 400, under control of user inputs via GUI 230 to host processor 210, for example, may be configured to retrieve bundle data related to at least a subset of the selectable fresh fuel bundle designs (stored in fresh fuel bundle design database 25) and to select, based on the retrieved bundle data, a target number of rod types from the initial population as the set of standardized rod types.

The user or designer may of course set and select the criteria for selecting the target number of rod types, for example. Various subordinate databases of database server 250 may thus be configured to store one or more of the constraint parameters (see database 251), initial population of rod types (database 256), a database of selectable fresh fuel bundle designs (database 252) from which the bundle data is retrieved and set of standardized rod types (also in fuel rod types database 256), for example.

Therefore, in accordance with the exemplary embodiments, a user may design or model a suitable fresh fuel bundle including one or more of the rod types from the standardized set of rod types determined as described above. Thus, a plurality of different fuel bundles may be manufactured which utilize a reduced number of different rod types (or standardized set of rod types) providing greater flexibility in design. Desired fuel bundles may then be created using one or more rod types of the standardized set. The manufactured bundles may be inserted in a given core of a selected reactor plant, such as during a planned maintenance outage, for example. In other words, and for a selected nuclear power plant to be evaluated, a core may be arranged with one or more fuel bundles that have been designed with one or more rod types of the standardized set, potentially providing improved operating efficiencies to extend the energy cycle and/or so as to operate at margins which are closer to core operating and/or safety limits, for example.

It should be understood that in selecting the target number of rod types, the filtering functions of eliminating rod types from the initial population by frequency of occurrence and/or higher costs may still not provide the user the desired target set of standardized rod types. The user may re-perform the database generation of S300 using the revised rod type population, in order to fine tune or modify the fuel bundle database of selectable fresh fuel bundle designs. Based on the bundle data stored in the revised fresh fuel bundle database, which includes a reevaluation of modified fresh fuel bundle designs with the revised population of rod types, the retrieving and analyzing functions may be repeated until a target number of rod types is achieved based on the filtering criteria related to frequency of occurrence and manufacturing costs.

Figure 5:
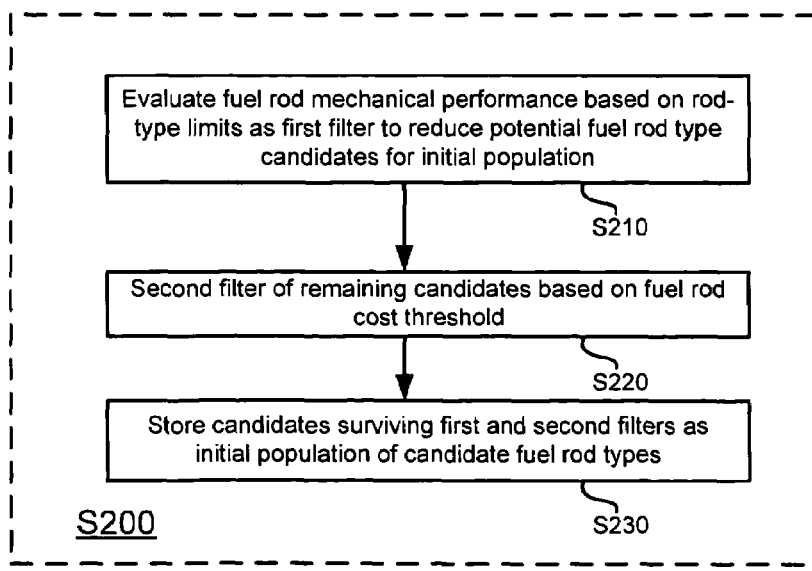
FIG. 5 is a flow chart illustrating how an initial population of rod types may be determined, in accordance with an exemplary embodiment of the present invention.

FIG. 5 is a flow chart illustrating how an initial population of rod types may be determined, in accordance with an exemplary embodiment of the present invention. Referring to FIG. 5, for each of the rod types in the initial population, the user may evaluate fuel rod mechanical performance (S210) based on a comparison to the rod-type limits retrieved from limits database 251.

For example, the user may evaluate fuel rod mechanical performance of a given fuel rod type in terms of one or more of the rod-type related limits, such as whether or not fuel rod mechanical performance is acceptable for one or more axial zones in the fuel rod type being evaluated. Other comparisons may be related to whether fuel rod mechanical performance is acceptable at a given number of acceptable boundaries for a specified number of axial zones in the given fuel rod, and/or whether fuel rod mechanical performance is acceptable in each axial zone, whether or not there is an acceptable enrichment concentration and/or an acceptable burnable absorber concentration within each axial zone of the fuel rod being evaluated. This evaluation of fuel rod mechanical performance based on a rod type limits may thus serve as a first filter to reduce the initial population of fuel rod type candidates.

The reduced or revised rod-type population may then be subject to a fuel rod cost analysis (S220). Those fuel rod types which satisfy or exhibit acceptable mechanical performance may be evaluated as to whether or not they meet a cost threshold for manufacturing or fabricating the fuel rod. This fuel rod cost threshold may be a value set by the user for a given application or for a given reactor plant being evaluated, for example. The fuel rod cost threshold may act as a second filter of the revised population to determine which rod types would serve as part of the initial population of rod types to be evaluated in one or more candidate fresh fuel bundle designs. The "surviving" candidates may then be stored (S230) in fuel rod types database 256 as the initial population of fuel rod types to be evaluated, in determining a standardized set of rod types, for example.

Figure 6:
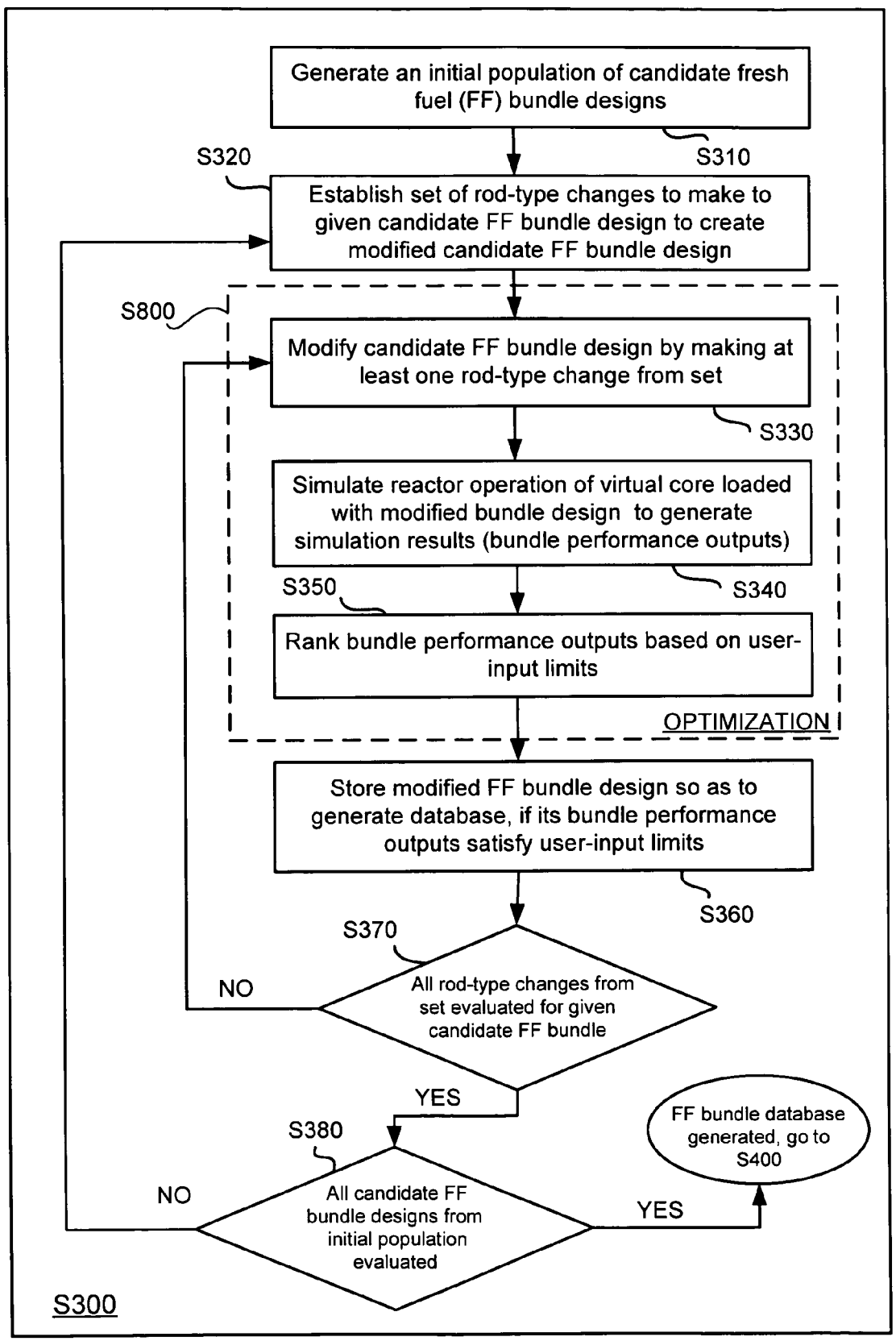
FIG. 6 is a flow chart illustrating how a database of selectable fresh fuel bundle designs may be generated, in accordance with an exemplary embodiment of the present invention.

FIG. 6 is a flow chart illustrating how a database of selectable fresh fuel bundle designs may be generated, in accordance with an exemplary embodiment of the present invention. In order to generate a fresh fuel bundle database for determining a target number of rod types (standardized set), an initial population of candidate fresh fuel bundle designs may be generated (S310). To generate the initial population, the user may access, from limits database 251, or input thereto, a plurality of user-input limits related to core performance parameters or safety criteria for the reactor plants being evaluated. The user-input limits are different from the rod-type related limits discussed above.

For example, the user-input limits may include one or more client-inputted plants specific design constraints, core performance criteria, operational parameter limits used for reactor operation, core safety limits and margins to the operational parameter and safety limits, for example. The user may input these limits into limits database 251 via GUI and host processor 210, or may access these (if already stored) from limits database 251. Based on the user input limits, the user may access historical fuel cycle designs database 254 to search for and/or select fresh fuel bundle designs which may be most consistent with the user-input limits (i.e., those designs which may only violate a few of the user-input limits, which produce desired energy characteristics, etc.) The user may create a suitable list or initial population of candidate fresh fuel bundle designs from historical fuel cycle designs database 254. This merely serves as a starting point for developing the fresh fuel bundle database of selectable fresh fuel bundle designs, which may be represented by database 252.

Once the initial population is generated, the user may establish a set of rod type changes to make to a given candidate fresh fuel bundle design (S320) so as to create a modified candidate fresh fuel bundle design. As will be described in further detail hereafter, the set of rod type changes may be established based on evaluating bundle performance metrics for a given fresh fuel bundle design. In general, for each bundle performance metric, given fuel rod types may be selected based on its influence on the metric, and other fuel rod changes may be determined which would span a maximum and minimum value or range of an acceptable bundle performance metric. The fuel rod changes may thus be stored in relational database server 250 in the bundle metrics database 258, for example, and may be used for modifying a given fuel bundle design to be subsequently simulated in a virtual core and ranked based on the simulation results, for example.

A given candidate fresh fuel bundle to be evaluated may be modified (S330) by making at least one rod-type change from the set of rod-type changes created at S320. The modified candidate fresh fuel bundle design may then be 'loaded' (i.e., virtually, using selectable input screens provided by host processor 210 of arrangement 1000) into a virtual core which is subjected to simulated reactor operation (S340) using suitable simulation software to generate simulation results, also known as bundle performance outputs.

The simulation may be executed by calculation servers 400; however, the simulation may be a 3D simulation process that is run external to the arrangement 1000. The user may employ well-known executable software-based 3D simulator programs such as PANACEA, LOGOS, SIMULATE, POLCA, or any other known simulator software where the appropriate simulator drivers have been defined and coded, as is known. The calculation servers 400 may execute these simulator programs based on input by the user via GUI 230.

Thus, the user may initiate a 3D simulation at any time using GUI 230, and may have a number and different means to initiate a simulation. For example, the user may select a "run simulation" from a window drop down menu, or could click on a "RUN" icon on an application tool bar, as is known. Additionally, the user may receive graphical updates or status of the simulation. Data related to the simulation may be queued in queue database 253 within relational database server 250. Once the simulation is queued, the user may have an audio and/or visual indication as to when the simulation is complete, for example.

The outputs from simulation (i.e., bundle performance outputs) may be ranked (S350) based on the user-input limits. A user may display data related to each of the outputs, as compared to whether or not a given bundle performance output has violated a user-input limit or constraint parameter, if desired. This may enable a user to make a visual comparison against a historical core design to determine whether there was any improvement with the virtual core loaded in accordance with the modified fuel bundle design, where improvement may be defined in terms of not exceeding the defined limits, or meeting certain energy requirements, for example.

As shown in FIG. 6, functions S330-S350 may be performed using an optimization process S800. In other words, the processing capabilities of the exemplary arrangement shown in FIGS. 1 and 2 may implement a software optimization routine to continually modify, simulate and rank simulation of bundle performance outputs until no further improvement is shown in a given fresh fuel bundle design being evaluated. Once the optimization routine has generated bundle performance output rankings (represented by corresponding objective function values resulting from the objective function used for optimization), which show no improvement from a previous iteration, the modified fresh fuel bundle design corresponding to that output may be stored so as to generate the fresh fuel database (S360).

It should be understood that utilizing optimization in generating the fresh fuel bundle database is only one exemplary mechanism. Repeated iterations could be performed using the processing capabilities of the exemplary arrangement 1000 based on manually-input commands by user, via GUI 230, for example. In any event, modified fresh fuel bundle designs which satisfy the user-input limits (or satisfied desired energy requirement for example if that is one of the limits), may be stored so as to populate fresh fuel bundle design database 252.

For each given fresh fuel bundle design, functions S330-S360 may be repeated until all rod type changes from the set have been evaluated for the given candidate fresh fuel bundle design (S370). Moreover, each candidate fresh fuel bundle design from the initial population may be evaluated in accordance with functions S320-S360 so as to realize the fresh fuel bundle database 252.

Figure 7:
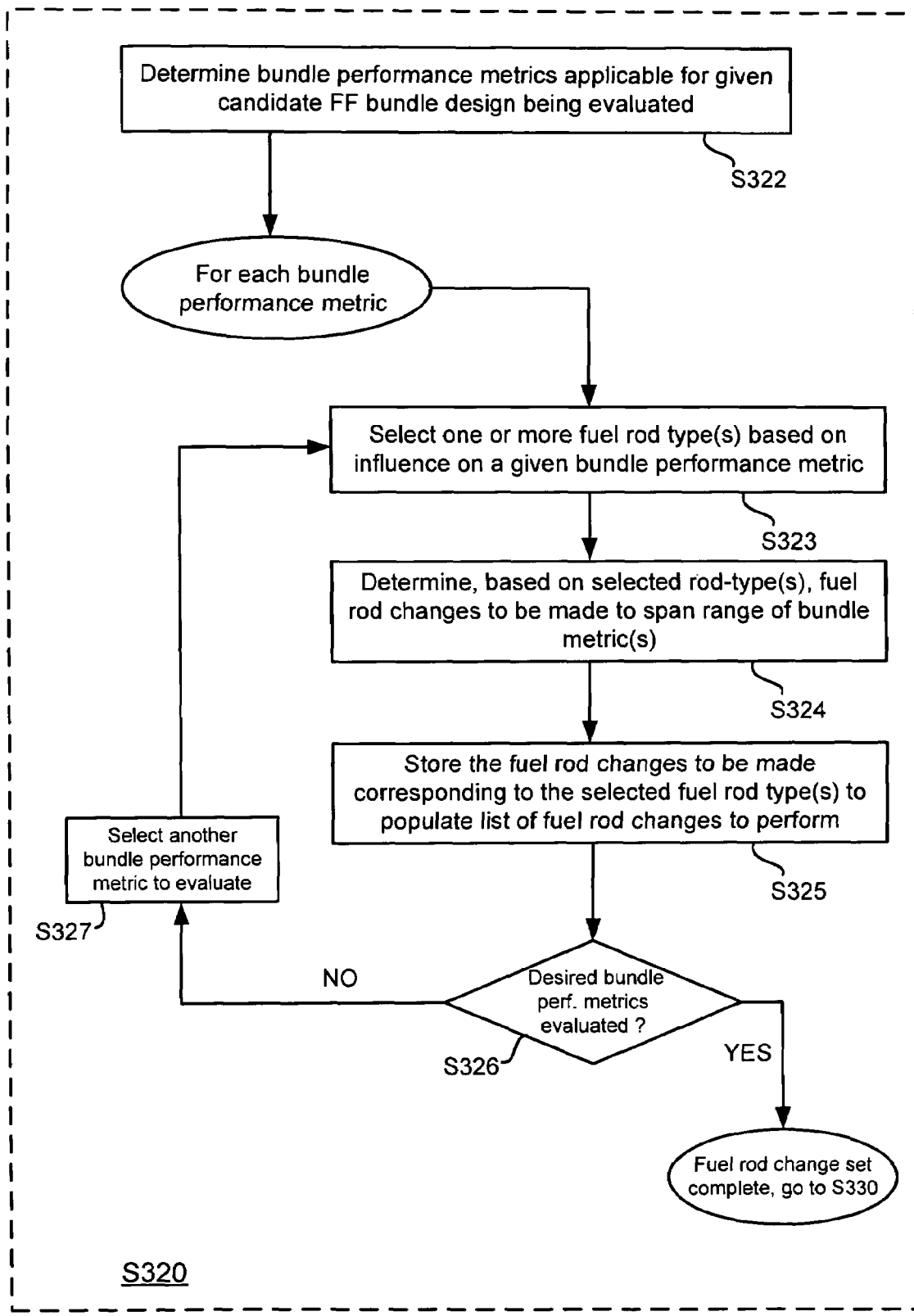
FIG. 7 is a flow chart illustrating the establishing of a set of rod type changes in FIG. 6 in more detail, in accordance with an exemplary embodiment of the invention.

FIG. 7 is a flow chart illustrating the establishing of a set of rod type changes in FIG. 6 in more detail, in accordance with an exemplary embodiment of the invention. FIG. 7 illustrates a more detailed explanation of function S320 to establish the set of fuel rod changes to be made for modifying one or more given fresh fuel bundle designs of the initial population.

Referring to FIG. 7, the user may determine bundle performance metrics applicable for a given fresh fuel bundle design being evaluated (S322) by accessing the bundle performance metrics from a bundle performance metrics database 258. For example, the user may select desired bundle performance metrics for viewing on a suitable graphical display, by selecting via GUI 230, desired bundle performance metrics from the database 258.

Each bundle performance metric may be evaluated in building the set of fuel rod changes to be performed on a given candidate fresh fuel bundle design. For example, a given fuel rod type may be selected (S323) from the fuel rod types database 256. The selection may be based on the rod types' influence on a given bundle performance metric being evaluated. Table 1 illustrates fuel rod variables which may be used to define a rod type; Table 2 illustrates bundle performance metrics and the fuel rod variables which may have to greatest influence on each given bundle performance metric, for example.

TABLE 1

Fuel Rod Variables

A. Number and Length of Axial Zones
B. Enriched Uranium Within A Given Zone
C. Burnable Poison Content Within A Given Zone
D. Total Enriched Uranium In Rod
E. Total Burnable Poison Content In Rod

TABLE 2

Bundle Performance Metrics (Fuel Rod Variables Affecting)

Reactivity Burnout (Hot Condition), (D, E)
Cold Shutdown Margin (Cold Condition), (A, B, C)
Local Exposure Accumulation, (A, B, C)
Radial Power Profile, (D, E)
Axial Power Profile, (A, B, C)
Local kW/ft, (A, B, C)

Referring to Tables 1 and 2, a given fuel rod type may be selected based on how the fuel rod variables of Table 1 affect a given performance metric in Table. 2. With respect to Table 1, fuel rod variables A-C represent local changes which may cause a local change in a given fuel bundle of a core. Fuel rod variables D and E represent global changes or fuel changes which may globally affect the core.

For example, reactivity burnout is the measure of the neutron multiplication factor, $k_\infty$, for a fuel bundle across an exposure history (e.g., three cycles, for example). As shown in Table 2, the fuel rod variables that most affect reactivity burnout (a global affect on the core) include the total enriched uranium (D) and total burnable poison (E) in a given fuel rod type.

For a cold shutdown margin bundle performance metric, which reflects the impact of the bundle on core reactivity at a cold condition, i.e., the reactor shutdown with all control blades in the core inserted except for the control blade adjacent to the bundle of interest which remains fully withdrawn, the fuel rod variables most affecting cold shutdown may include the number and length of axial zones (A), enriched uranium within a given zone (B) and the burnable poison content within a given zone (C). These fuel rod variables would have a local affect on a given bundle in the core.

The local exposure accumulation metric reflects a measure of exposure of each rod from the beginning of rod life to the end of rod life and is most affected by the rod variables A-C. Rod exposure are accumulated based on the local power in each fuel rod integrated over time.

The radial power profile, which is a pin-by-pin shape of the power profile of a bundle, affects the critical power ratio (power at which a film layer forms due to critical heat flux (CHF) divided by the power to which there is a margin to CHF). Fuel rod variables D and E have the greatest influence the radial profile.

For the axial power profile (which is a z-axis profile and which affects how long a fuel cycle in a reactor may be run), fuel rod variables A-C may most influence the axial power profile bundle performance metric. The local kW/ft bundle performance metric reflects local power in a pellet, such as fuel temperature in the pellet or in the cladding of the rod. As shown in Table 2, fuel rod variables A-C have the most influence on this bundle performance metric. Accordingly, depending upon the particular bundle performance metrics to be evaluated, the user may select a given fuel rod type which determines how one or more of the fuel rod variables affect one or more given bundle performance metrics.

Based on the selected rod type, the user may determine one or more fuel rod changes to be made so as to span a maximum and minimum acceptable value for each bundle performance metric, or range of the bundle performance metric (S324). Table 3 illustrates fuel rod changes which may be made to span a given bundle performance metric range.

TABLE 3

Fuel Rod Changes to Span Bundle Metric Range

| Desired Change to Bundle Performance Metric | Change Made to Influencing Fuel Rod Variable(s) |
| --- | --- |
| Increase Reactivity Burnout | Increase Total Uranium Enrichment Decrease Total Poison Content |
| Decrease Reactivity Burnout | Decrease Total Uranium Enrichment Increase Total Poison Content |
| Increase Margin in Cold Shutdown | Selectively Increase Poison Content In Upper or Lower Axial Zone(s), Selectively Decrease Uranium Enrichment in Upper or Lower Axial Zone(s) |
| Decrease Margin in Cold Shutdown | Selectively Decrease Poison Content in Upper or Lower Axial Zone(s), Selectively Increase Uranium Enrichment in Upper or Lower Axial Zone(s) |
| Decrease Local Exposure Accumulation | Decrease Uranium Enrichment/ Increase Total Poison Content in Encompassing Zone(s), Modify Axial Zone Lengths, Introduce Additional Encompassing Zone(s) |
| Increase Local Exposure Accumulation | Increase Uranium Enrichment/ Decrease Total Poison Content in Encompassing Zone(s), Modify Axial Zone Lengths, Remove Axial Zone(s) |
| Decrease Radial Power Peaking | Decrease Total Uranium Enrichment, Increase Total Poison Content |
| Increase Radial Power Peaking | Increase Total Uranium Enrichment, Decrease Total Poison Content |
| Decrease Axial Power Peaking | Increase Poison Content in Lower Axial Zone(s), Decrease Uranium Enrichment in Lower Axial Zone(s) |
| Increase Axial Power Peaking | Decrease Poison Content in Lower Axial Zone(s), Increase Uranium Enrichment in Lower Axial Zone(s) |
| Decrease Local kW/ft | Decrease Uranium Enrichment in Encompassing Zone, Increase Total Poison Content in Encompassing Zone, Modify Axial Zone Lengths, Add Additional Axial Zones |
| Increase Local kW/ft | Increase Uranium Enrichment in Encompassing Zone, Decrease Total Poison Content in Encompassing Zone, Modify Axial Zone Lengths, Remove Additional Axial Zones |

Referring to Table 3, and as an example, if the user desires fuel rod changes that will increase margin—in cold shutdown, the user would make a rod-type change which would reduce poison content in the upper axial zone(s) of the bundle and increase uranium enrichment in the upper axial zones of the bundle, for example. Thus, for the given bundle performance metric, a number of rod changes may be selected which would be stored (S325) in relational database 250 so as to populate a list of fuel rod changes to perform on a given candidate fresh fuel bundle design and store in bundle performance metrics database 258. A fuel rod change set may be complete once desired bundle performance metrics have been evaluated (output of S326 is YES) by the user.

Figure 8:
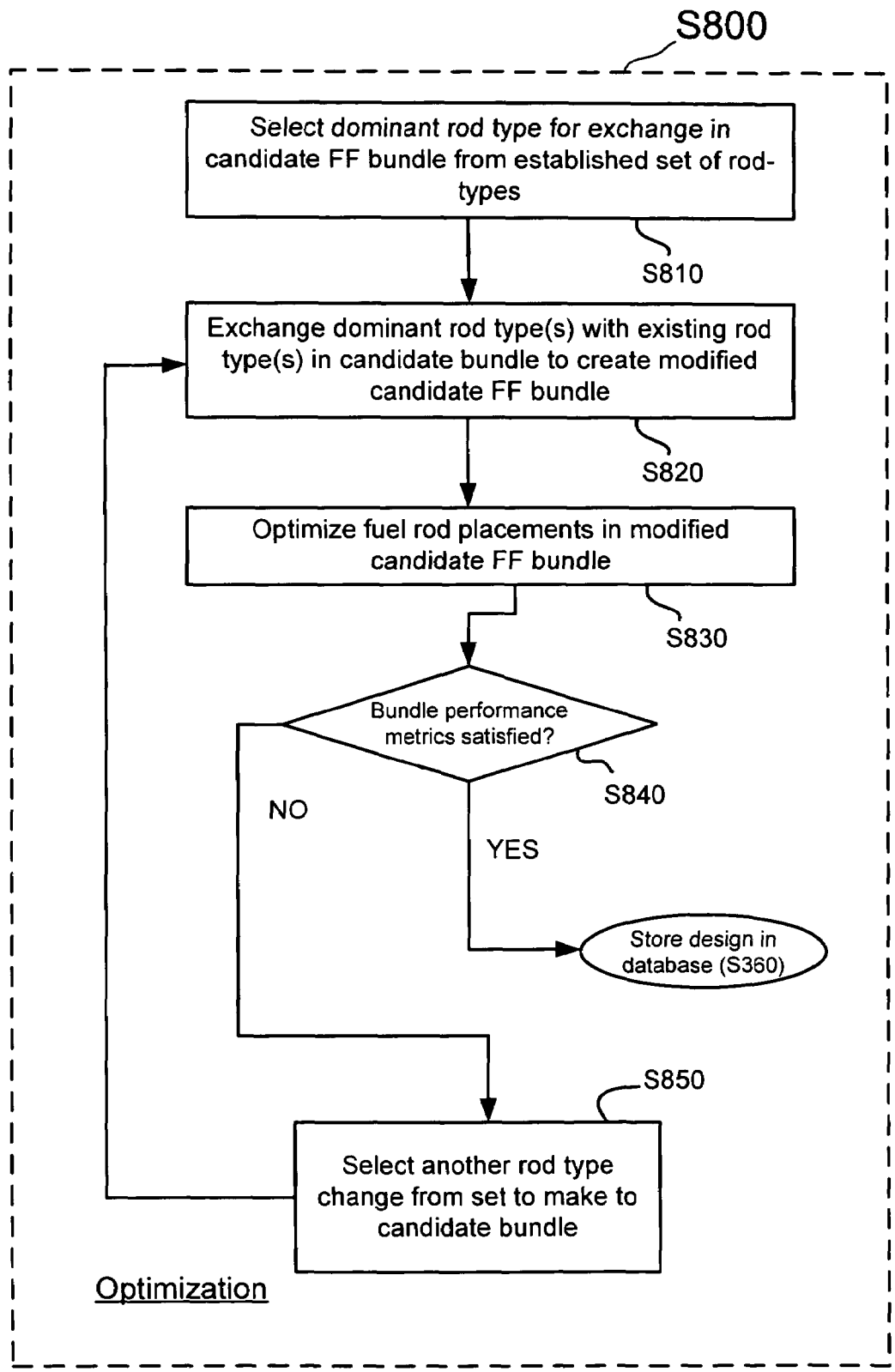
FIG. 8 is a flow chart illustrating an optimization process for determining desired rod types for a given candidate fresh fuel bundle, in accordance with an exemplary embodiment of the invention.

FIG. 8 is a flow chart illustrating an optimization process for determining desired rod types for a given candidate fresh fuel bundle, in accordance with an exemplary embodiment of the invention. As discussed above, functions of S330-S350 in FIG. 6 may be performed using an optimization routine. Referring now to FIG. 8, as part of optimization routine S800, user may select a dominant rod type for exchange in a candidate fresh fuel bundle from the established set of rod types (S810). The dominant rod type may be a rod which has a dominating influence on one or more of the user input limits related to plant-specific design constraints, core performance criteria, operational and/or limits, core safety limits and margins to the operational parameters and the core safety limits, for example. This may be manually selected by the user or may be determined by a suitable criteria for selecting a dominant rod type from the set of rod types, for example.

The dominant rod type may be exchanged with existing rod types in the candidate fresh fuel bundle design so as to create a modified candidate fresh fuel bundle design (S820). Specific fuel rod replacements within the modified candidate fresh fuel bundle may be determined using optimization (S830) until bundle performance metrics are satisfied (S840). A given candidate fresh fuel bundle design being evaluated which, based on the optimization of the fuel rod placements, satisfies all bundle performance metrics, may be stored so as to populate fresh fuel bundle design database 252, for example. Otherwise, (output of S840 is "NO"), another rod type change may be selected from the set to modify the candidate fresh fuel bundle (S850), and functions S820-S840 may be repeated.

Figure 9:
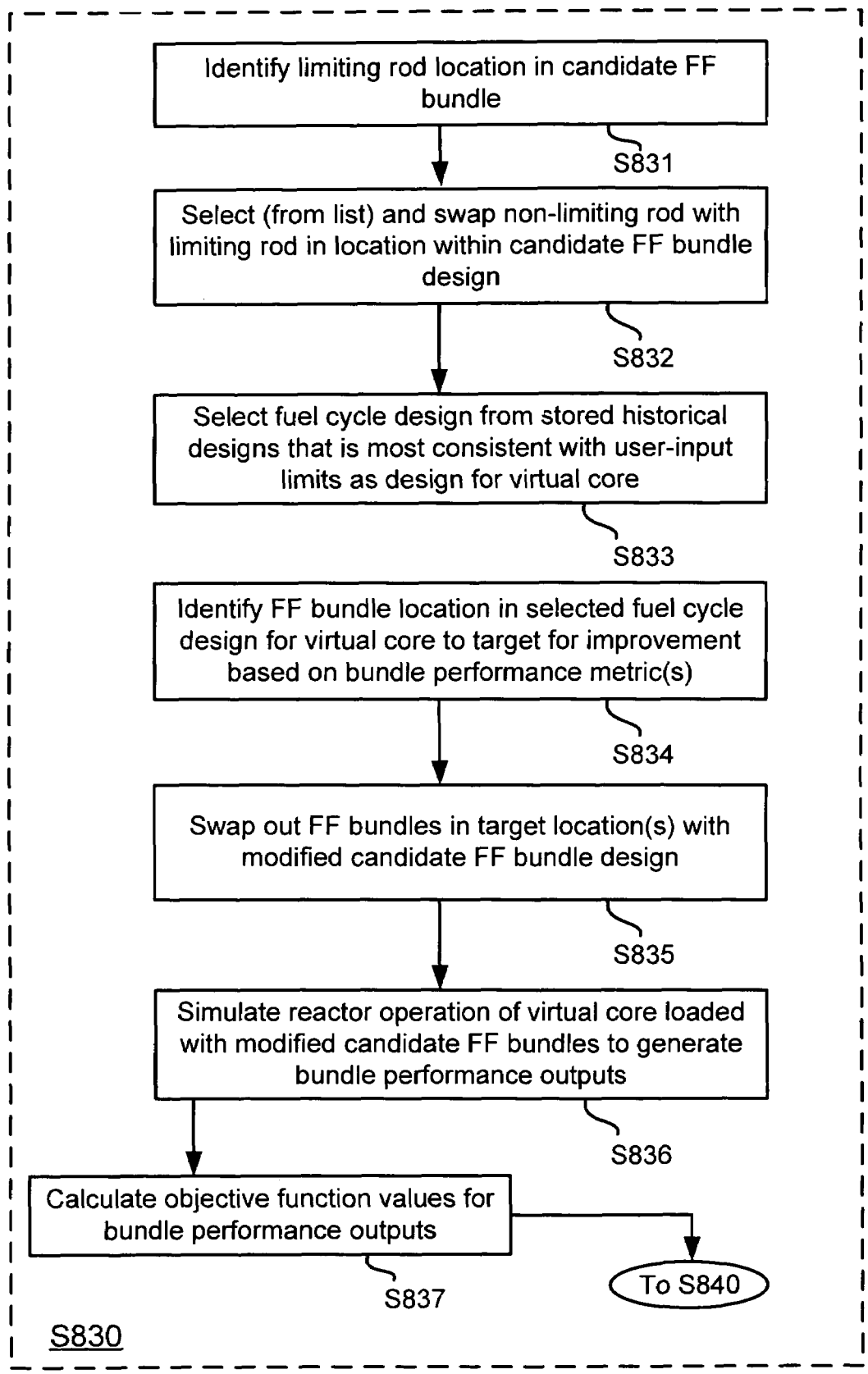
FIG. 9 is a flow chart illustrating the optimizing of fuel placements in FIG. 8 in more detail, in accordance with an exemplary embodiment of the invention.

FIG. 9 is a flow chart illustrating the optimizing of fuel placements in FIG. 8 in more detail, in accordance with an exemplary embodiment of the invention. FIG. 9 illustrates the fuel rod placement optimization S830 processing in more detail.

Referring to FIG. 9, one or more limited rod in the candidate fresh fuel bundle design to be evaluated may be identified (S831). A non-limiting rod or rods may then be selected from a stored list of non-limiting rods (which may be stored in relational database 250 prior to the optimization or may be input by the user) and swapped with the limiting rod or rods in the location of the limiting rod(s) within the candidate fresh fuel bundle design (S832).

The modified fresh fuel bundle design with the replaced non-limiting rod may then be 'loaded' into a suitable fuel cycle core design or "virtual core". User may select a fuel cycle design from stored fuel cycle designs database 254 that is most consistent with the user input limits for the users (S833). In other words, the user selects an overall core design for the virtual core that most satisfies the majority of user input limits and/or within an acceptable margin to the user input limits.

Once the fuel cycle design is selected, the user may identify fresh fuel bundle locations in the selected design for the virtual core to target for improvement, based on the input bundle metrics (S834). For example, the user may display a top view cross section of the virtual core to be simulated, and target specified bundle locations within the core for insertion of one or more fresh fuel bundles from the modified fresh fuel bundle design. Fuel bundles in the target locations may then be swapped out (S835) and replaced with the modified candidate fresh fuel bundle design.

The virtual core loaded in accordance with the modified fresh fuel bundle design may then be simulated (S836) using a suitable simulation software-based simulation program in order to generate simulation results (bundle performance outputs). An objective function may be used to calculate objective function values corresponding to the bundle performance outputs (S837) to determine whether or not the bundle performance metrics for the candidate fresh fuel bundle design are satisfied, or satisfied within an acceptable margin thereto (See FIG. 8, S840). Thus, the objective function values may be used for ranking the bundle performance outputs of the given fresh fuel bundle design against the bundle performance metrics.

Figure 10:
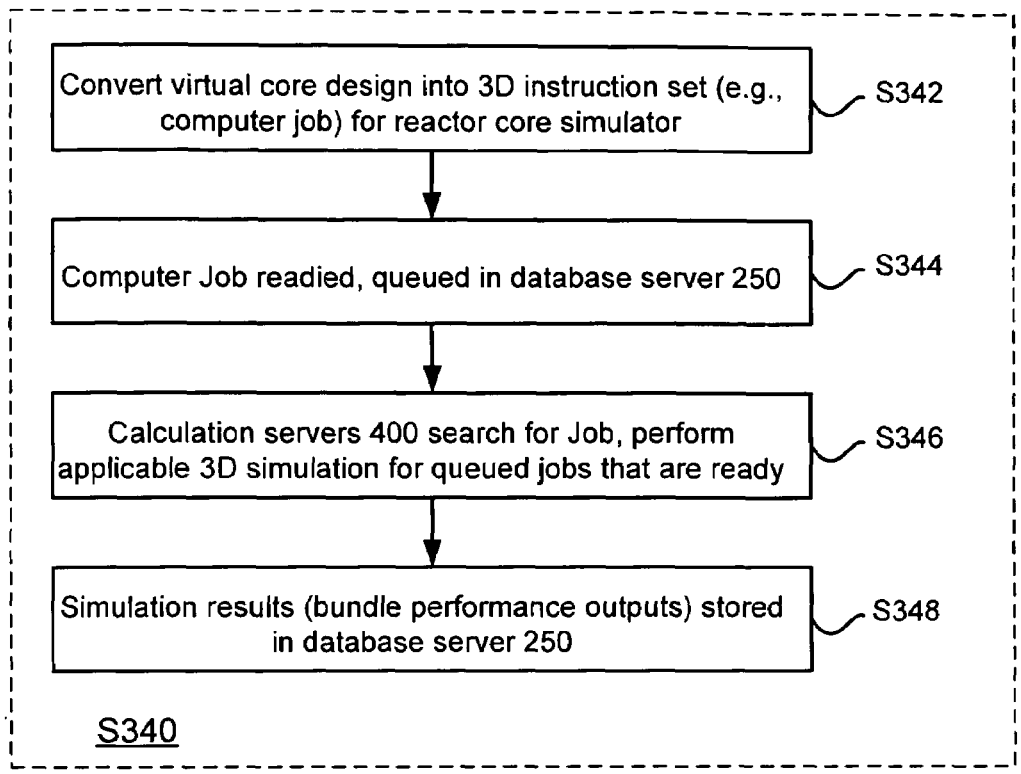
FIG. 10 is a flow chart illustrating the simulating of FIG. 6 in more detail in accordance with an exemplary embodiment of the invention.

FIG. 10 is a flow chart illustrating the simulating of FIG. 6 in more detail in accordance with an exemplary embodiment of the invention. FIG. 6 may describe simulation as recited in S340 of FIG. 6 and/or the simulation at S836 in FIG. 9, for example.

Once the user initiates simulation, many automation steps follow. Initially, all definitions for the core design problem are converted into a 3D instruction set (e.g., a computer job) for a 3D reactor core simulator (S342). This enables the user to have a choice of several types of simulators, such as the simulators described above. Selection of a particular simulator may be dependent on the plant criteria entered by the user (e.g. the limits). The computer job is readied for queuing in the queue database 253 of each relational database server 250 (S344). The storing of the data for a particular simulation enables any potential simulation iteration to start from the last or previous iteration. By storing and retrieving this data, future simulation iterations to a core design take only minutes or seconds to perform.

Concurrently, a program running on each of the available calculation servers 400 scans every few seconds to look for available jobs to run (S346). If a job is ready to run, one or more of the calculation servers 400 obtains the data from the queue database 253 and runs the appropriate 3D simulator. As described above, one or more status messages may be displayed to the user. Upon completion of the simulation, all results of interest may be stored (S348) in one or more subordinate databases within the relational database server 250 (e.g., simulation results database 255). Accordingly, the relational database server 250 may be accessed in order to calculate the objective function values for the test core design.

Figure 11:
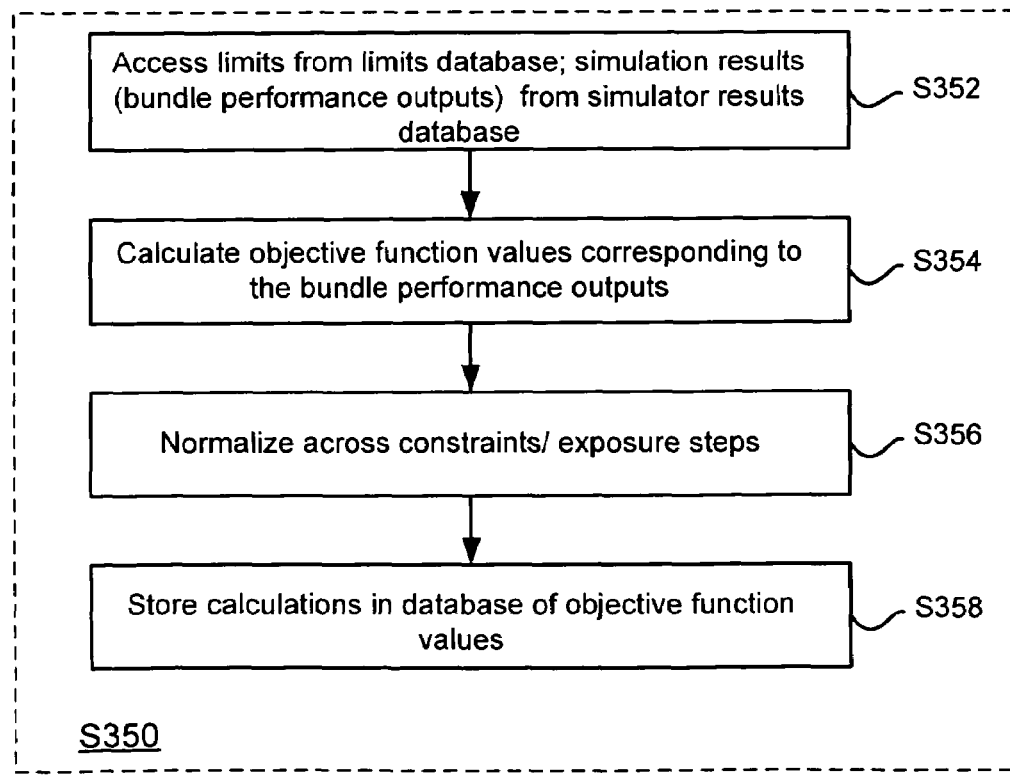
FIG. 11 is a flow chart illustrating the ranking of FIG. 6 in more detail in accordance with an exemplary embodiment of the invention.

FIG. 11 is a flow diagram illustrating the ranking step of FIG. 6 in further detail. In ranking the bundle performance outputs, an objective function may be calculated (see for example, S837 in FIG. 9) in order to compare how closely a simulated core design (i.e., virtual core) with a given candidate fresh fuel bundle design meets the user-input limits, which also may be referred to as 'constraints'. An objective function is a mathematical equation that incorporates the constraints or limits and quantifies the core design's adherence to the limits. For example, based upon the results of the simulation and the calculated objection function values, the user, who may be a core designer, engineer or plant supervisor for example, may be able to determine if a particular core design meets the user's limit requirements (i.e., meets a maximum cycle energy requirement).

The objective function may be stored in relational database server 250 for access by calculation servers 400. Objective function calculations, which provide objective functions values, may also be stored in the relational database server 250, such as in a subordinate objective function value database 257. Referring to FIG. 11, inputs to the objective function calculation may include the user-input limits from the limits database 251 and the simulator results (bundle performance outputs) from the simulator results database 255. Accordingly, one or more calculation servers 400 may access this data from relational database server 250 (S352).

Although the method and arrangement of the present invention envision any number of objection function formats that could be utilized, one embodiment includes an objective function having three components: (a) the user-input limit for a particular constraint parameter (e.g., design constraint for reactor plant parameter), represented as "CONS"; the simulation result from the 3D simulator for that particular constraint parameter, represented as "RESULT", and a multiplier for the constraint parameter, represented by "MULT". A set of predefined MULTs may be empirically determined from a large collection of nuclear plant configurations (such as from a collection of BWR plants, a collection of PWR plants, etc), for example. These multipliers may be set at values that enable reactor energy, reactivity limits, and thermal limits to be determined in an appropriate order.

Accordingly, a generic set of empirically-determined multipliers may be used in accordance with the exemplary embodiments, which may be applied to over N different core designs. However, GUI 230 may permit manual changing of the multipliers, since user preference may desire certain constraints to be "penalized" with greater multipliers than the multipliers identified by the preset defaults.

An objective function value may be calculated for each individual constraint parameter, and for all constraint parameters as a whole, where all constraint parameters represent the entity of what is being evaluated in a particular core. An individual constraint component of the objective function may be calculated as described in Equation (1):

$$OBJ_{par} = MULT_{par} * (RESULT_{par} - CONS_{par}); \quad (1)$$

where "par" may be any of the user-input limits. It is to be understood that these parameters are not the only parameters that could be possible candidates for evaluation, but are parameters which are commonly used in order to determine a suitable core configuration for a nuclear reactor. The total objective function may be a summation of all constraint parameters, or $$OBJ_{TOT} = SUM(par=1,31)\{OBJ_{par}\} \quad (2)$$

Referring to Equation 1, if RESULT is less than CONS (e.g. there is no violation of a constraint), the difference is reset to zero and the objective function will be zero. Accordingly, objective function values of zero indicate that a particular constraint (i.e., user input limit) has not been violated by the simulation result (i.e., bundle performance output). Positive values of the objective function represent violations that may require correction. Additionally, the simulation results may be provided in the form of special coordinates (i, j, k) and time coordinates (exposure step) (e.g., particular time in a core-energy cycle). Therefore, the user can see at which time coordinate (e.g., exposure step) the problem is located. Hence, modifications to the core may be made to target the identified exposure step.

In addition, objective function values may be calculated as a function of each exposure step, and totaled for the entire design problem (S354). The objective function values calculated for each constraint, and the objective function values per exposure step, may be further examined by normalizing each objective function value to provide a percentage contribution of a given constraint to a total objective function value (S356). Each result or value of an objective function calculation may be stored (S358) in a subordinate objective function value database 257 within relational database server 250, for example.

The objective function values may be utilized in the manual determination of core development. For example, the values of the objective function calculations may be viewed graphically by the user in order to determine parameters that violate limits. Additionally, any change in objective function values over successful iterations of core design provides the user with a gauge to estimate both improvement and detriment in their proposed design.

Increases in an objective function value over several iterations may indicate that the user's changes are creating a core design that is moving away from a desired solution, while successive iterations of lesser objective functions values (e.g., the objective function value decreasing from a positive value towards zero) may indicate improvements in the iterative core design. The objective function values, limits and simulation results over successive iterations may be stored in various subordinate databases within relational database server 250. Therefore, designs from past iterations may be quickly retrieved, should later modifications prove unhelpful.

Although implementation of the exemplary methodologies is described primarily in terms of hardware components in FIGS. 1 and 2 above, the exemplary methodologies may also be embodied in software as a computer program. For example, a program in accordance with the exemplary embodiments of the present invention may be a computer program product causing a computer to determine a set of standardized rod types for use in one or more cores of a plurality of nuclear reactor plants.

The computer program product may include a computer-readable medium having computer program logic or code portions embodied thereon for enabling a processor of the arrangement to determine a set of standardized rod types for use in one or more cores of a plurality of nuclear reactor plants.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks (trademark), cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the determining of a standardized set of rod types, in accordance with the exemplary methods described herein.

The exemplary embodiments of the present invention may provide several advantages. The exemplary methodology may enable the determination of a given number of types and placements of standardized fuel rod types in a fresh fuel bundle within a nuclear reactor core design, which satisfies multiple core constraints and/or bundle performance metrics for a number of different reactors.

In contrast to current core designs, which typically utilize any number of different rod types, without regard to cost or performance, in developing fuel bundle or rod pattern designs for a particular core of a particular nuclear reactor plant, a specified, standardized set of rod types may be determined. Accordingly, a potentially limitless amount of different fuel bundles may be fabricated using a reduced number of different fuel rod types. This may allow for greater efficiency and flexibility in core design, reduced manufacturing costs, with potentially improved safety margins to core thermal limits.

Additionally, the exemplary embodiments may utilize a computing environment to effect a substantial reduction in the amount of time needed to create a desirable set of standardized rod types for use in different nuclear reactors. The method may adhere perfectly to a user's input constraints or design limits for particular reactor core designs, and with a fewer number of different rod types, may offer greater operational flexibility to change core designs rapidly and simulate the altered designs, as compared to the conventional manual iterative process. Further, errors may no longer be made in attempting to generate a simulator input file, as described with respect to the manual iterative process.

The exemplary embodiments of the present invention being thus described, it will be obvious that the same may be varied in many ways. For example, the functional blocks of FIGS. 1-11 describing the exemplary arrangement and/or methods may be implemented in hardware and/or software. The hardware/software implementations may include a combination of processor(s) and article(s) of manufacture. The article(s) of manufacture may further include storage media and executable computer program(s).

The executable computer program(s) may include the instructions to perform the described operations or functions. The computer executable program(s) may also be provided as part of externally supplied propagated signal(s). Such variations are not to be regarded as departure from the spirit and scope of the exemplary embodiments of the present invention, and all such modifications as would be obvious to one skilled in the art are intended to be included within the scope of the following claims.

What is claimed:

1. A computer-implemented method of determining a set of standardized rod types for use in one or more cores of one or more nuclear reactor plants, comprising:
    defining a set of rod-type-related limits;
    determining, based on the limits, an initial population of rod types to be evaluated for use in cores of a selected number of the one or more nuclear reactor plants;
    generating a database of selectable fresh fuel bundle designs comprising one or more of the initial population of rod types, the database of selectable fresh fuel bundle designs applicable to the one or more cores;
    retrieving, from the database, bundle data related to at least a subset of the selectable fresh fuel bundle designs; and
    displaying to a user, based on the retrieved bundle data, a target number of rod types from the initial population that satisfies the set of rod-type-related limits as the set of standardized rod types.

2. The method of claim 1, wherein the set of standardized rod types is fabricated as part of a fresh fuel bundle for use in the one or more cores of the selected nuclear reactor plants.

3. The method of claim 1, wherein defining the rod-type-related limits comprises user-inputting rod-type manufacturing conditions comprising one or more of an allowable enrichment blend limit for a given fuel rod, an allowable burnable absorber blend limit for the given fuel rod, an allowable axial zone within a given fuel rod limit, and allowable rod types for a given fuel bundle limit.

4. The method of claim 3, further comprising:
storing the set of rod-type-related limits.

5. The method of claim 1, wherein the target number of rod types is less than the initial population of rod types.

6. The method of claim 1, wherein determining an initial population of rod types comprises:
determining whether a given rod type is a candidate for the initial population based on at least one of fuel rod mechanical performance and fuel rod cost.

7. The method of claim 1, wherein determining an initial population of rod types comprises, for a given candidate rod type:
evaluating whether fuel rod mechanical performance of the given candidate is acceptable as related to the set of rod-type-related limits and, for candidates determined as having acceptable mechanical performance,
comparing candidate cost against a desired cost threshold; and
storing performance information and rod type characteristics for each candidate which is below the cost threshold to populate the initial population.

8. The method of claim 7, wherein the initial population with associated performance information and rod type characteristics is accessed for generating the database of selectable fresh fuel bundle designs.

9. The method of claim 1, wherein generating the database of selectable fresh fuel bundle designs is performed using one or more optimization processes.

10. The method of claim 1, wherein generating the database of selectable fresh fuel bundle designs comprises:
generating an initial population of candidate fresh fuel bundle designs to be evaluated in a virtual core from stored historical fresh fuel bundle designs;
establishing a set of rod-type changes to make to a given candidate in the initial population so as to create a modified candidate fresh fuel bundle design;
modifying the given candidate fresh fuel bundle design by making at least one rod-type change from the set therein;
simulating reactor operation of the virtual core loaded with the modified bundle design so as to generate a plurality of simulation results, the simulation results comprising bundle performance outputs representative of the modified bundle design;
ranking the bundle performance outputs based on a plurality of user-input limits; and
storing the modified candidate fresh fuel bundle design if the bundle performance outputs meet or are within an accepted margin to the user-input limits, so as to generate the database.

11. The method of claim 10, further comprising, for each bundle design of the initial population:
repeating the modifying, simulating, rankings, and storing to populate the database with additional candidate fresh fuel bundle designs.

12. The method of claim 11, wherein the modifying, simulating, rankings, and storing are performed for some or all of the fresh fuel bundle designs in the initial population.

13. The method of claim 10, wherein a given candidate fresh fuel bundle design represents a design for one of a single fresh fuel bundle, multiple fresh fuel bundles, and multiple groups of fresh fuel bundles to be evaluated in a given core.

14. The method of claim 10, wherein the user-input limits comprise one or more of client-inputted plant:specific design constraints, core performance criteria, operational parameter limits used for reactor operation, core safety limits, and margins to those operational parameter limits and safety limits.

15. The method of claim 1, wherein selecting a target number of rod types further comprises:
creating, from the retrieved bundle data, a frequency histogram for fuel rod type occurrences in the subset of fresh fuel bundle designs;
eliminating, based on the histogram, rod types of the initial population which have a frequency of occurrence below a given threshold to create a modified rod-type population;
ranking the modified rod-type population based on fabrication cost; and
eliminating higher cost, lower-frequency of occurrence rod types from the modified population until the target number of rod types is achieved.

16. The method of claim 1, wherein the one or more nuclear reactor plants comprise at least one nuclear reactor selected from a group comprising boiling water reactors, pressurized water reactors, gas-cooled reactors liquid-metal reactors, and heavy water reactors.

17. A method of operating a nuclear reactor having a core outfitted with at least one fuel bundle comprising one or more rod types of the set of standardized rod types determined in accordance with the method of claim 1.

18. An arrangement for determining a set of standardized rod types for use in one or more cores of one or more nuclear reactor plants, comprisin:
an interface for receiving constraint parameters comprising one or more of a set of rod-type-related limits, plant-specific design constraints, core performance criteria, operational parameter limits used for reactor operation, core safety limits, and margins to those operational parameter limits and safety limits;
a processor configured to:
determine, based on at least the rod-type-related limits, an initial population of rod types to be evaluated for use in cores of a selected number of the one or more nuclear reactor plants;
generate selectable fresh fuel bundle designs comprising one or more of the initial population of rod types which are applicable to the one or more cores;
retrieve bundle data related to at least a subset of the selectable fresh fuel bundle designs; and
display to a user, based on the retrieved bundle data, a target number of rod types from the initial population as the set of standardized rod types; and
a memory for storing one or more of the constraint parameters an initial population of rod types, a database of selectable fresh fuel bundle designs from which the bundle data is retrieved, and the set of standardized rod types.

* * * * *